United States Patent
Bedard et al.

(10) Patent No.: US 11,826,954 B2
(45) Date of Patent: Nov. 28, 2023

(54) IN-SITU DECORATIVE WRAPPING METHODS FOR POLYMERIC ADDITIVELY MANUFACTURED COMMODITIES

(71) Applicant: Ford Global Technologies, LLC, Dearborn, MI (US)

(72) Inventors: Robert D. Bedard, Allen Park, MI (US); Matthew Cassoli, Dearborn, MI (US); Jeffery N. Conley, Belleville, MI (US); Giuseppe Domenic Lacaria, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 17/037,047

(22) Filed: Sep. 29, 2020

(65) Prior Publication Data
US 2022/0097296 A1    Mar. 31, 2022

(51) Int. Cl.
| | |
|---|---|
| *B29C 64/153* | (2017.01) |
| *B29C 64/245* | (2017.01) |
| *B29C 64/364* | (2017.01) |
| *B29C 64/209* | (2017.01) |
| *B29K 105/00* | (2006.01) |
| *B33Y 10/00* | (2015.01) |

(52) U.S. Cl.
CPC .......... *B29C 64/153* (2017.08); *B29C 64/209* (2017.08); *B29C 64/245* (2017.08); *B29C 64/364* (2017.08); *B29K 2105/256* (2013.01); *B33Y 10/00* (2014.12)

(58) Field of Classification Search
CPC ..... B60R 13/02; B29C 64/147; B29C 64/245; B29C 64/153; B29C 64/364; B29C 64/209; B29K 2105/256; B33Y 10/00
See application file for complete search history.

(56) References Cited

U.S. PATENT DOCUMENTS

| | | | |
|---|---|---|---|
| 9,281,186 B2 | 3/2016 | Wootton | |
| 2017/0100903 A1* | 4/2017 | Rodriguez | B29D 11/00442 |
| 2018/0345879 A1* | 12/2018 | Chapeau | B33Y 80/00 |
| 2019/0193333 A1* | 6/2019 | Braunroth | B29C 64/379 |
| 2021/0046704 A1* | 2/2021 | Huttunen | B29C 64/393 |

FOREIGN PATENT DOCUMENTS

| | | |
|---|---|---|
| WO | 2014193961 | 12/2014 |
| WO | 2017093264 | 6/2017 |

\* cited by examiner

*Primary Examiner* — Nahida Sultana
*Assistant Examiner* — Jamel M Nelson
(74) *Attorney, Agent, or Firm* — Burris Law, PLLC (57) ABSTRACT

Methods of in-situ additively manufacturing (AM) a part include placing a blank of a decorative material onto a platform and applying an AM material onto the blank such that the blank and the AM material simultaneously contour to a shape of the platform to form the part. The AM material may be applied onto the part by an extrusion process. The blank and the AM material may be under vacuum. The blank and/or the AM material may be directly or indirectly heated while the AM material is applied onto the blank.

9 Claims, 8 Drawing Sheets

IN-SITU DECORATIVE WRAPPING METHODS FOR POLYMERIC ADDITIVELY MANUFACTURED COMMODITIES

FIELD

The present disclosure relates to additively manufactured parts, and more specifically to decorative wrapping methods for such additively manufactured parts.

BACKGROUND

The statements in this section merely provide background information related to the present disclosure and may not constitute prior art.

Additive manufacturing (AM) has undergone significant advancements in recent years, and more particularly in the automotive industry. Automotive parts can now be tailored to meet a variety of load/operating conditions and can be made of both metal and plastic materials.

Several conventional methods exist to adhere decorative finishes to a substrate. Under conventional in-mold decorative wrapping processes, a decorative film is placed within a chamber and is molded to a desired shape. Subsequently, a material, such as a resin, is deposited on the decorative film. There are various conventional processes for in-mold decorating, including but not limited to in-mold filming processes, where resin is injected behind a pre-cut piece of a film, foil, or other wrapping that was previously inserted into and formed in a mold; in-mold transfer decoration processes, where resin is injected against a carrier that holds a decorative element, which is compressed within a molding tool, after which the decorative element is transferred to a molten plastic, and the carrier is indexed on a spool; and, vacuum forming, where a film, foil, or wrapping is applied over the surface of a pre-molded substrate using heat and pressure. Such processes are limited by conventional molding requirements and have substantial tooling costs. Moreover, as such conventional methods require particularized tooling and capital equipment, changing to different patterns, shapes, among others, to form differently shaped parts can result in substantial downtime.

These issues related to decoratively wrapping parts are addressed by the present disclosure.

SUMMARY

This section provides a general summary of the disclosure and is not a comprehensive disclosure of its full scope or all of its features.

According to a form of the present disclosure, a method of additively manufacturing a part includes placing a blank onto a platform and extruding an additive manufacturing (AM) material via a nozzle onto the blank to simultaneously contour the blank and an extrudate AM material into a part taking on a shape of the platform.

In a variation, the platform includes a membrane. In other such variations, extruding the AM material via the nozzle over the blank deforms the membrane, and the blank and the extrudate AM material form a part taking on the shape of the deformed membrane.

In another variation, the platform includes an array of pins. In other such variations, extruding the AM material via the nozzle over the blank deforms the array of pins into a desired profile, and the blank and the extrudate AM material form a part taking on the shape of the deformed array of pins.

In a further variation, the platform includes a forming cup with a vacuum. In other such variations, the vacuum deforms the blank and the extrudate AM material to form a part contouring to a shape of the forming cup.

In a still further variation, the extrudate AM material is extruded onto the blank using a spaghetti infill printing technique.

In an even further variation, the AM material is extruded via a plurality of nozzles onto the blank to contour the blank and the extrudate AM material into a part taking on the shape of the platform.

In another form, a method of additively manufacturing a part includes placing a porous blank onto a platform and applying an AM material onto the blank while the blank is under vacuum to form the blank and the AM material into a part contouring to a shape of the platform. The blank and the AM material simultaneously form the part contouring to the shape of the platform.

In a variation, the platform includes a membrane. In other such variations, the vacuum deforms the membrane, and the blank and the AM material forms a part contouring to the shape of the deformed membrane.

In another variation, the platform includes an array of pins. In other such variations, the vacuum deforms the array of pins over a desired profile, and the blank and the AM material forms a part contouring to a shape of the deformed array of pins. In yet other such variations, the array of pins includes at least one of a graphic, font, grain, text, or texture that is imprinted onto the part.

In a further variation, the platform includes a forming cup. In other such variations, the vacuum deforms the blank and the AM material to form a part contouring to a shape of the forming cup.

In a further still variation, the AM material is applied to the blank with at least one of a powder bed fusion (PBF) process and a material jetting process.

In a further form, a method of additively manufacturing a part includes placing a blank onto a platform within a chamber, heating at least one of the platform, the chamber, and the blank to indirectly or directly heat the blank, and applying an AM material onto the blank to form the blank and the AM material into a part contouring to a shape of the platform. The blank and the AM material simultaneously form the part contouring to the shape of the membrane.

In a variation, the platform includes at least one of a platform and an array of pins.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 3A-3C shows the in-situ AM and wrapping system according to FIGS. 1A-1C according to a variation of the platform where.

FIG. 4A-4C shows the in-situ AM and wrapping system according to FIGS. 1A-1C according to another variation of the platform where.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides resins for forming parts having a decorative overlay via additive manufacturing (AM). Resins that are suitable for forming parts according to the present disclosure include acrylonitrile butadiene styrene (ABS), polypropylene, polylactic acid, polyamides, acrylics, polyoxymethylene, polystyrene, polycarbonates, polyethylene, thermoplastic polyurethane, thermoplastic rubbers, among others, including mixtures thereof, and generally include a wide array of materials so long as the material is capable of forming parts according to the methods contemplated herein and are desirable for forming parts according to the methods contemplated herein. According to some variations, the resins include thermoplastics. Optionally, the resins can include a filler, such as glass or carbon fiber, to increase mechanical, chemical, or thermal properties (e.g., to increase stiffness). The resins have the material wrapped thereon. The decorative wrapping can include various materials, including but not limited to films, foils, and wrappings comprised of plastics, metals, fabrics, fibers, among others. Where necessary, an adhesive may be placed on the material before application of the resin.

Figure 1A:
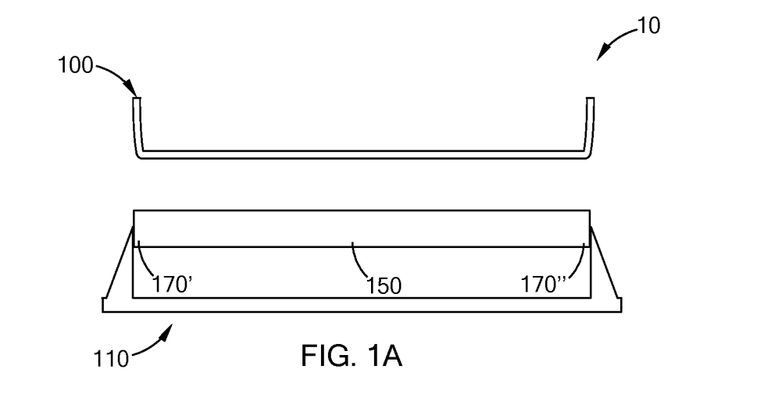
FIG. 1A shows an in-situ additive manufacturing (AM) and wrapping system according to the teachings of the present disclosure before a blank is placed on a platform.
Figure 1B:
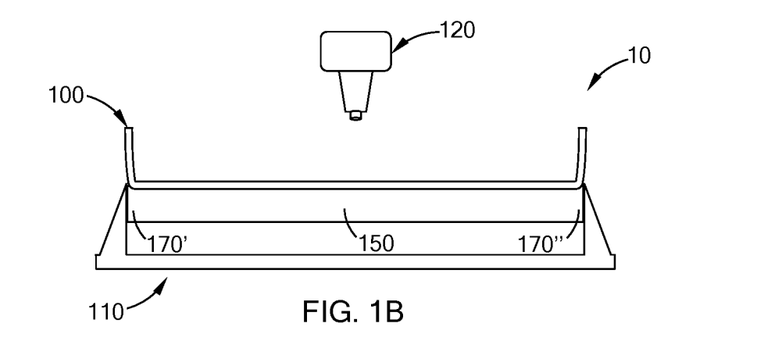
FIG. 1B shows an in-situ AM and wrapping system according to the teachings of the present disclosure after a blank is placed on a platform.
Figure 1C:
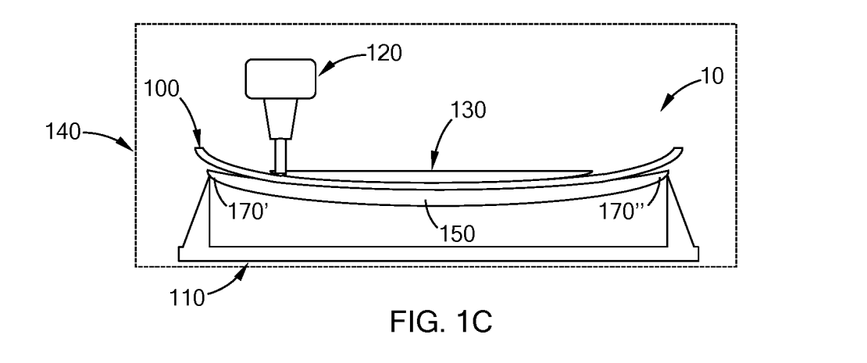
FIG. 1C shows an in-situ AM and wrapping system according to the teachings of the present disclosure after the blank contours to a shape of the platform.
Figure 2:
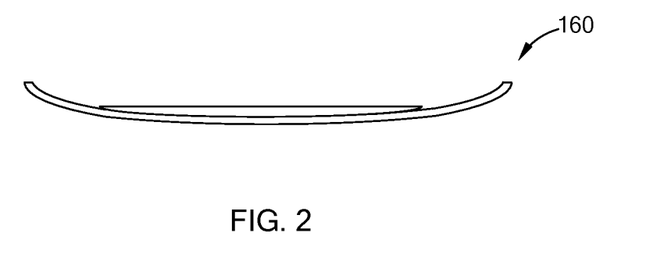
FIG. 2 shows a part made by the in-situ AM and wrapping system of FIGS. 1A-1C.

Referring to FIGS. 1A-1C, an in-situ additive manufacturing (AM) and wrapping system 10 is shown. The system includes a blank 100 of the decorative material, which is placed onto a platform 110, and an applicator 120 (also referred to herein as a nozzle 120) that applies an AM material 130. The platform 110 and the applicator 120 may be independently movable relative to one another in up, down, and side to side directions. As shown in FIG. 1C and described more fully herein, the platform 110 deforms and the blank 100 and the AM material 130 simultaneously deform such that the blank 100 and the AM material 130 form a part 160 (as shown in FIG. 2) that contours to a shape of the platform 110 along a desired profile. The contouring may occur by directly or indirectly heating the blank 100 to a temperature such that the viscosity of the blank 100 is low enough that it naturally contours to the shape of the platform 110, by vacuum, or by gravity when the weight of the AM material 130 is such that the blank 100 contours to the shape of the platform 110.

While in FIG. 1 the applicator 120 is shown as a nozzle depositing the AM material 130 via an extrusion process (also known as a material extrusion process, a fused filament fabrication (FFF) process, or a fused deposition modeling (FDM) process), the present disclosure also contemplates at least one of a powder bed fusion (PBF) process and a material jetting process to deposit the AM material 130 onto the blank 100. In a variation where an extrusion process is used, the applicator 120 may distribute the AM material 130 onto the blank 100 with a spaghetti infill printing technique. In such a technique, the applicator 120 distributes the AM material 130 onto the blank 100 in a random pattern while the blank 100 contours to a shape of the platform 110 according to the teachings of the present disclosure.

Optionally, the AM material 130 is heated as it is applied to the blank 100. Optionally, the AM material 130 is heated before it is applied to the blank 100. Optionally, the platform 110 is heated to heat the blank 100. Optionally, the blank 100 is directly heated. Optionally, the in-situ AM and wrapping system 10 further includes a chamber 140 (shown in phantom in FIG. 1C), and the chamber 140 is heated to indirectly heat the blank 100 and/or the AM material 130. The amount of heat supplied or the temperature may be dictated by the material selected as the blank 100, the AM material 130, or a combination of each. In another variation, the platform 110 may include a vacuum that exerts a pressure on the blank 100 and the AM material 130, pulling the blank 100 against the surface of the platform 110.

The platform 110 may include a membrane 150. As used herein, a membrane may be any of at least an elastomeric material, fluoropolymers, medium flexible rubbers, steel sheets with spring backings, among others. In some variations, the membrane may comprise the blank itself. When applicator 120 applies the AM material 130, the blank 100 and the membrane 150 deform such that the blank 100 and the AM material 130 simultaneously conform to a shape of the deformed membrane 150. The deformation may occur along a desired profile such that the blank 100 and the membrane 150 deform into a desired shape such that the blank 100 and the AM material 130 form a part 160 (as shown in FIG. 2) that contours to a shape of the platform 110 along a desired profile.

Figure 3A:
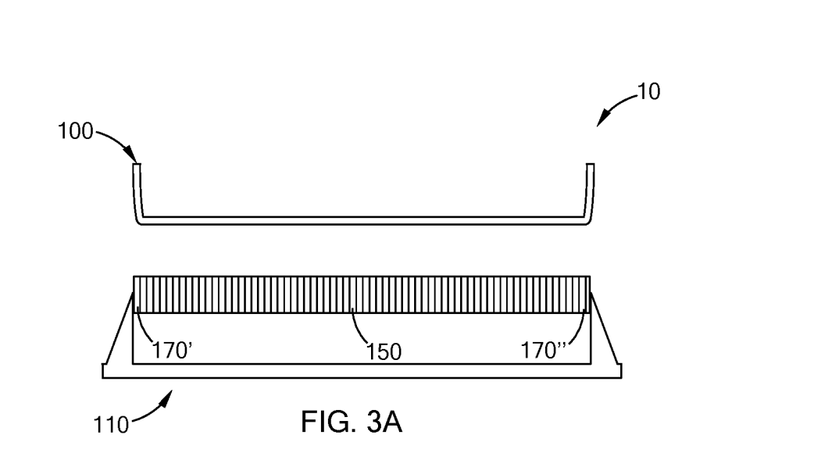
FIG. 3A shows the in-situ AM and wrapping system before a blank is place on a platform.
Figure 3B:
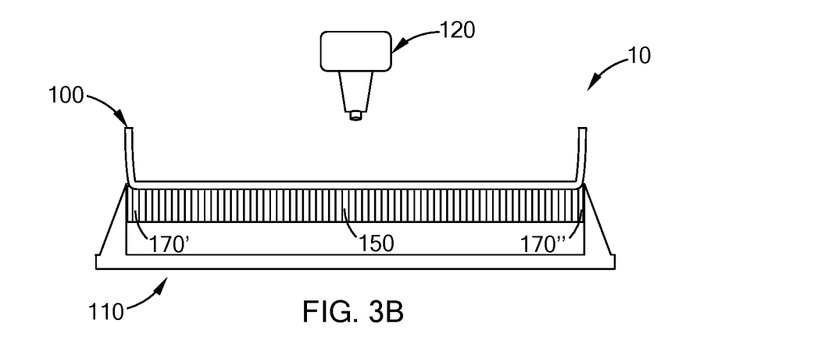
FIG. 3B shows the in-situ AM and wrapping system after a blank is place on the platform.
Figure 3C:
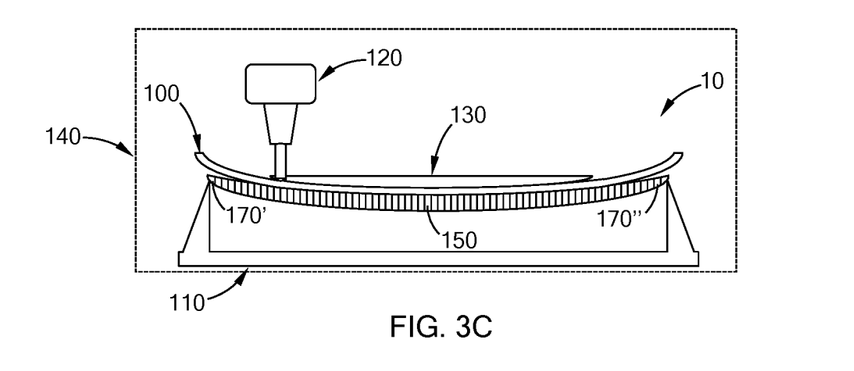
FIG. 3C shows the in-situ AM and wrapping system after the blank contours to a shape of the platform.

Turning to FIGS. 3A-3C, a variation of the platform 110 of the in-situ (AM) and wrapping system 10 includes an array of pins 170. As used herein, an array of pins means a plurality of pins that are independently deformable along a predetermined profile. In other words, pin 170' may deform to a predetermined depth and pin 170" may deform to a predetermined depth, where the depths may be the same or different. A part (such as part 160) made using an array of pins accordingly may have complex textures, graphics, fonts, among others, imprinted thereon depending on the profile of the predetermined depths of the pins of the array of pins 170.

Figure 4A:
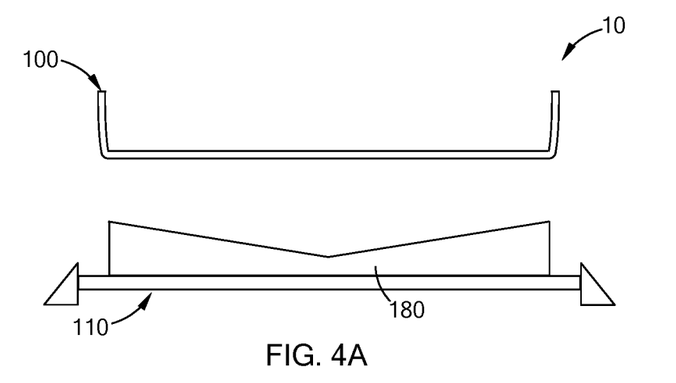
FIG. 4A shows an in-situ AM and wrapping system before a blank is place on a platform.
Figure 4B:
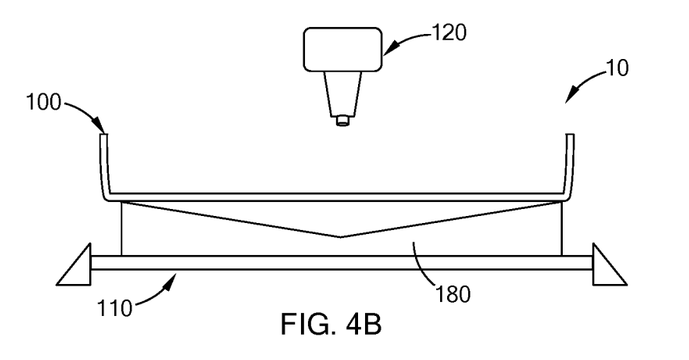
FIG. 4B shows the in-situ AM and wrapping system after a blank is place on the platform.
Figure 4C:
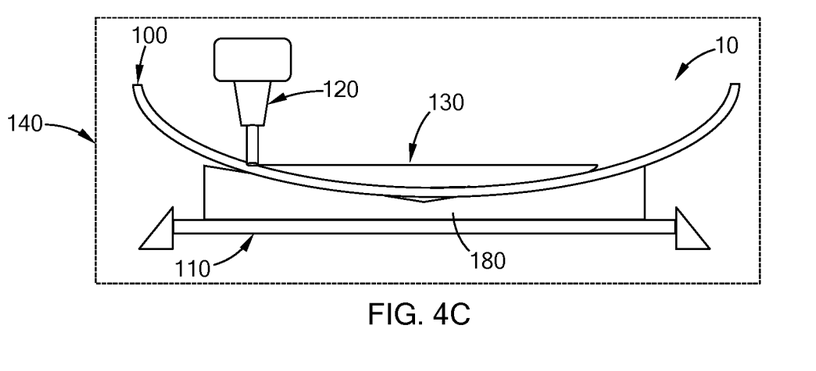
FIG. 4C shows the in-situ AM and wrapping system after the blank contours to a shape of the platform.

Turning to FIGS. 4A-4C, a variation of the platform 110 of the in-situ (AM) and wrapping system 10 includes a forming cup 180. The forming cup 180 can be formed of various materials, such as AM polymer and/or metal, and the composition of the forming cup 180 may be selected to provide desired stiffness, toughness, heat transfer profiles, porosity so that a vacuum will better pull the blank 110, among others. Further, the surface of the forming cup 180 can have printed thereon surface characteristics, such as complex textures, graphics, fonts, among others, such that a part (such as part 160) formed from contouring against the forming cup 180 is imprinted with such surface characteristics of the forming cup 180.

Figure 5:
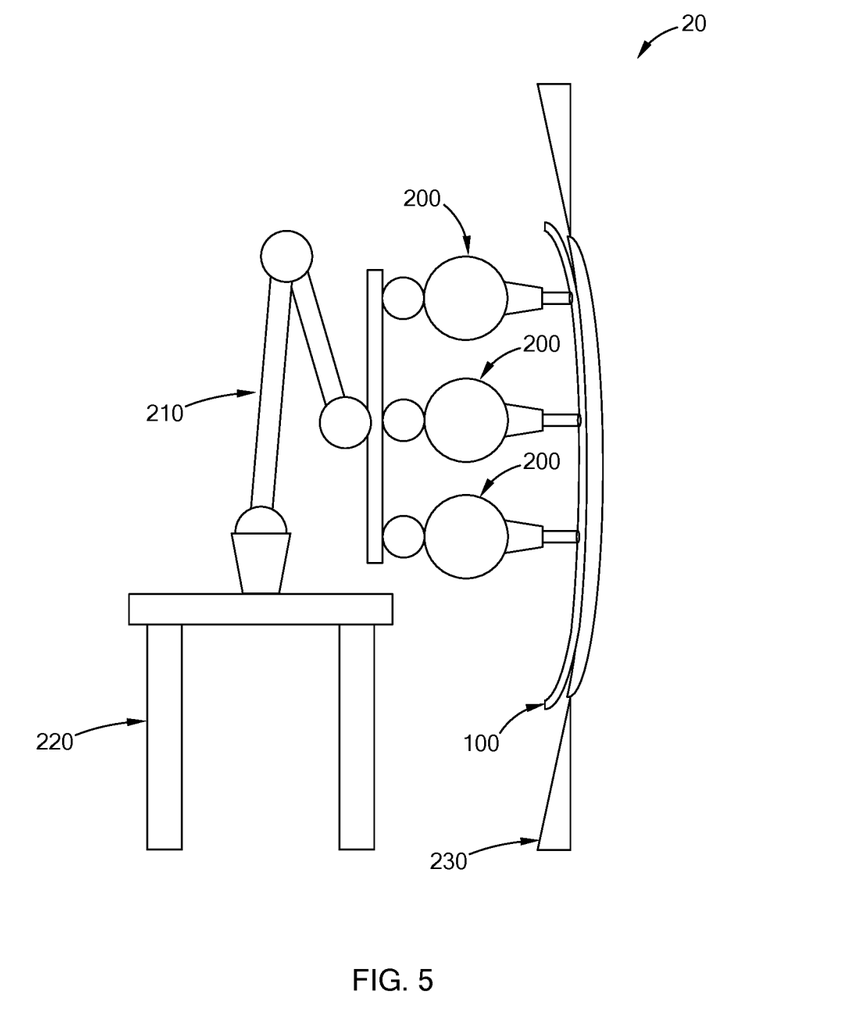
FIG. 5 shows an in-situ AM and wrapping system according to a variation of the present disclosure.

Turning to FIG. 5, a variation of the in-situ AM and wrapping system 10 according to FIGS. 1A-1C, hereinafter referred to as an in-situ AM and wrapping system 20, includes a plurality of applicators 200 controlled by a robot 210. The robot 210 controls the position of the applicators 200 and allows for multiple degrees of movement of the applicators 200. The robot 210 may be mounted on a stand 220 stand, which may be static, or, if further range of motion is desired, dynamic. The robot 210 may independently control each of the applicators 200. While three applicators 200 are shown, there may be more or fewer applicators as desired. It is contemplated that in such a variation, a platform 230 could include a membrane (like the membrane 150), an array of pins (like the array of pins 170) and/or a forming cup 180. In this manner, it is contemplated that complex and/or large pieces, such as body panels, can be formed according to the teachings of the present disclosure. It is also contemplated that a carrier having graphics imprinted thereon can serve as a blank (such as blank 100).

Figure 6:
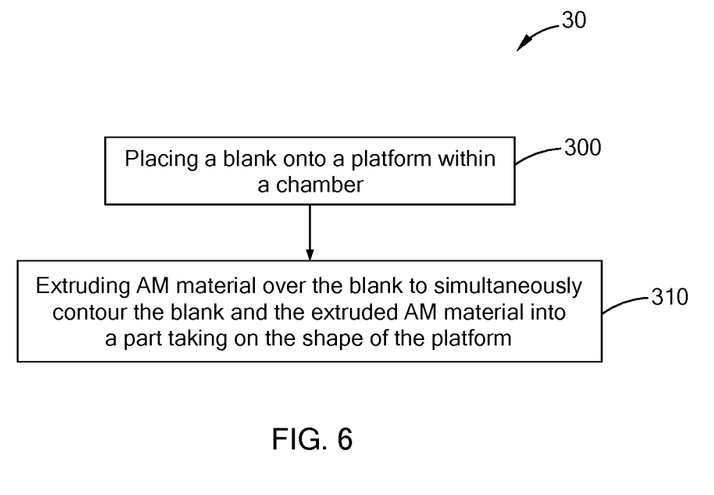
FIG. 6 is a flowchart for a method 30 of forming an AM part according to the teachings of the present disclosure.

Referring now to FIG. 6, a flow chart for a method 30 of forming an additively manufactured part is shown. The method includes placing a blank onto a platform at 300. At 310, an applicator extrudes AM material onto the blank, which simultaneously contours the blank and the extruded AM material into a part taking on the shape of the platform. In variations, the platform may include any of a membrane, an array of pins, or a forming cup with a vacuum. Where the platform includes a membrane, extruding AM material via the nozzle onto the blank deforms the membrane, and the blank and extruded AM material form a part taking on the shape of the deformed membrane. Where the platform includes an array of pins, the extrudate AM material deforms the array of pins into a desired profile, and the blank and the extrudate AM material form a part taking on the shape of the deformed array of pins. Where the platform includes a forming cup with a vacuum, the vacuum deforms the blank and extrudate AM material to form a part contouring a shape of the forming cup. In another variation, the extrudate AM material is extruded onto the blank using a spaghetti infill printing technique. In a further variation, the AM material is extruded with a plurality of nozzles onto the blank to contour the blank and the extrudate AM material into a part taking on the shape of the platform.

Figure 7:
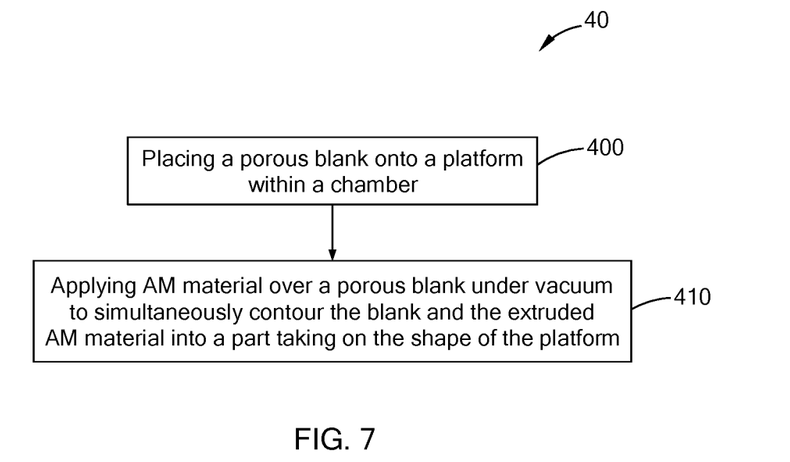
FIG. 7 is a flowchart for a method 40 of forming an AM part according to the teachings of the present disclosure.

Referring now to FIG. 7, a flow chart for a method 40 of forming an additively manufactured part is shown. The method includes placing a porous blank onto a platform at 400. At 410, an AM material is applied onto the blank while the blank is under vacuum (i.e., the vacuum exerts a negative pressure through the porous blank) to form the blank and the material into a part contouring to a shape of the platform. The blank and the AM material simultaneously form the part contouring to the shape of the platform. In variations, the platform may include any of a membrane, an array of pins, or a forming cup with a vacuum. Where the platform includes a membrane, the vacuum deforms the membrane, and the blank and the AM material forms a part contouring to the shape of the deformed material. Where the platform includes an array of pins, the vacuum deforms the array of pins over a desired profile, and the blank and the AM material forms a part contouring to a shape of the deformed array of pins. In such an array of pins configuration, the array of pins may include a profile that imprints on the part a graphic, font, grain, text, and/or texture. Where the platform includes a forming cup, the vacuum deforms the blank and the AM material to form a part contouring to a shape of the forming cup. In another variation, the material is applied to the blank with at least one of a PBF process and a material jetting process.

Figure 8:
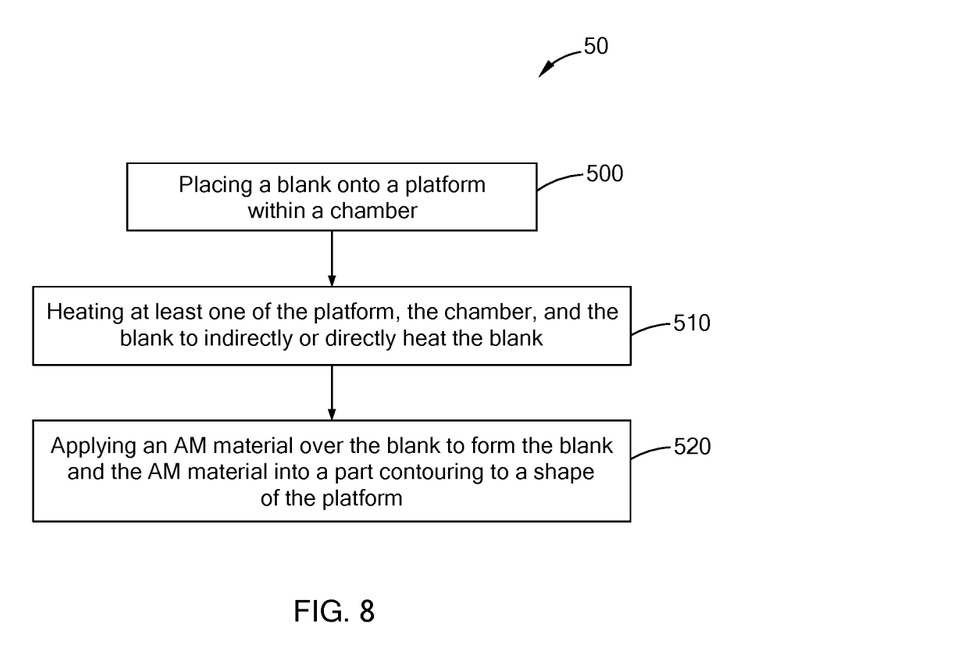
FIG. 8 is a flowchart for a method 50 of forming an AM part according to the teachings of the present disclosure.

Referring now to FIG. 8, a flow chart for a method 50 of forming an additively manufactured part is shown. The method includes placing a blank onto a platform within in a chamber at 500. At least one of the platform, the chamber, and the blank is heated to indirectly or directly heat the blank at 510. An AM material is applied onto the blank to form the blank and the AM material into a part contouring to a shape of the platform at 520. The blank and the AM material simultaneously form the part contouring to the shape of the platform. In a variation, the platform includes at least one of a membrane and an array of pins.

As used herein, the term "contour to a shape of the platform" is intended to mean that a blank and an AM material contours to at least a portion of a platform. The platform may be shaped such that the resultant part is only a small surface area of the platform. Alternatively, the platform may be shaped such that the resultant part covers a large or even entire surface area of the platform.

Spatially relative terms, such as "up", "down", "side to side," "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of additively manufacturing a part, the method comprising:
   placing an undeformed blank onto a platform;
   extruding an additive manufacturing (AM) material via a nozzle onto the blank to form a part; and
   simultaneously deforming the blank into the platform while extruding the AM material.

2. The method of additively manufacturing a part according to claim 1, wherein the platform comprises a membrane.

3. The method of additively manufacturing a part according to claim 2, wherein extruding the AM material via the nozzle onto the blank deforms the membrane, and the blank and the extrudate AM material form the part taking on the shape of the deformed membrane and the platform.

4. The method of additively manufacturing a part according to claim 1, wherein the platform comprises an array of pins.

5. The method of additively manufacturing a part according to claim 4, wherein extruding the AM material via the nozzle onto the blank deforms the array of pins into a desired profile, and the blank and the extrudate AM material form the part taking on the shape of the deformed array of pins of the platform.

6. The method of additively manufacturing a part according to claim 1, wherein the platform comprises a forming cup with a vacuum.

7. The method of additively manufacturing a part according to claim 6, wherein the vacuum deforms the blank and the extrudate AM material to form the part contouring to a shape of the forming cup of the platform.

8. The method of additively manufacturing a part according to claim 1, wherein the extrudate AM material is extruded onto the blank using a spaghetti infill printing technique.

9. The method of additively manufacturing a part according to claim 1 further comprising extruding AM material via a plurality of nozzles onto the blank to contour the blank and the extrudate AM material into a part taking on the shape of the platform.

* * * * *